June 12, 1962 W. DRALLE 3,038,280
INTERNAL STOCK DIVIDER
Filed June 23, 1958
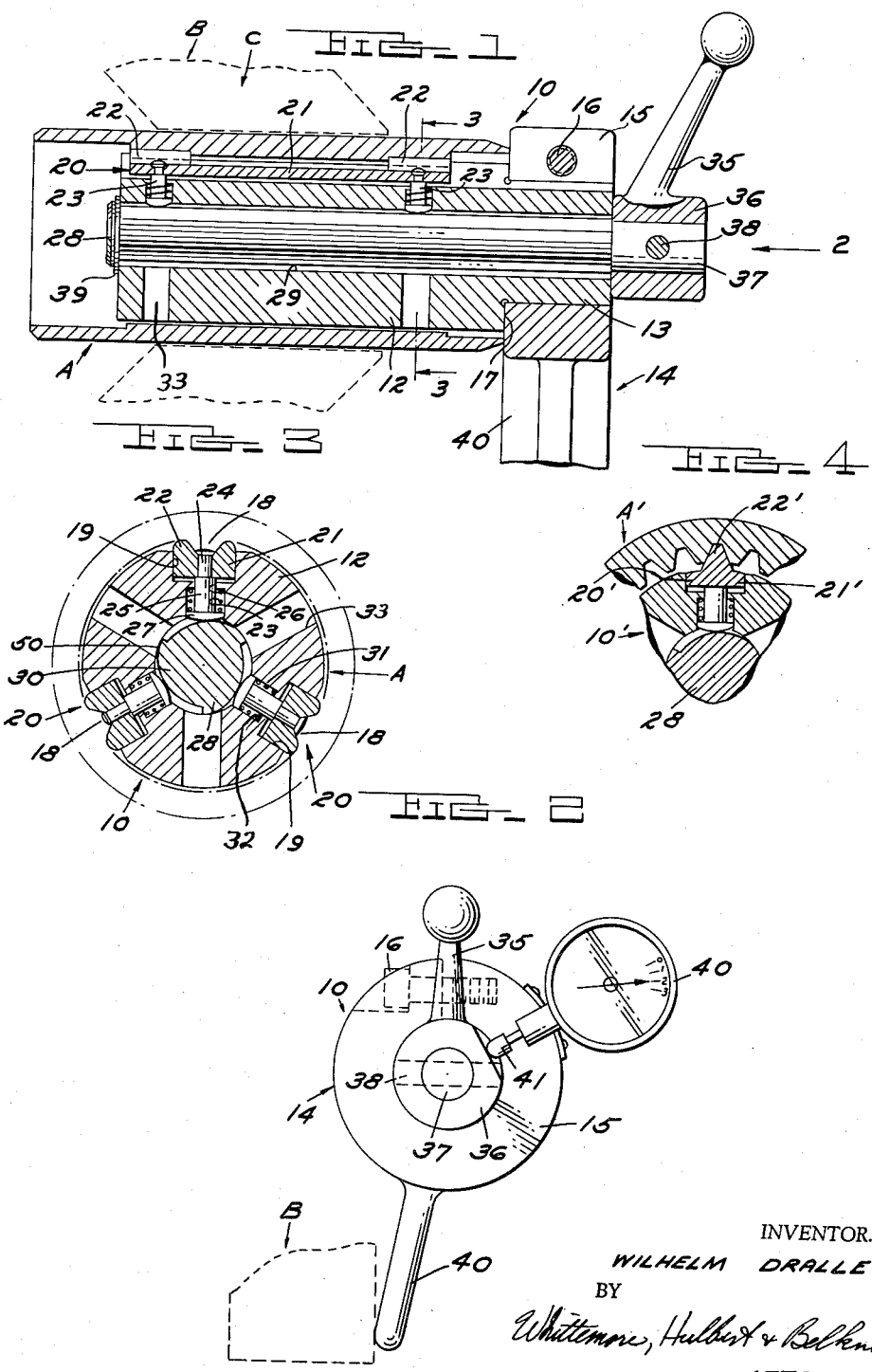
INVENTOR.
WILHELM DRALLE
BY
Whittemore, Hulbert & Belknap
ATTORNEYS

United States Patent Office 3,038,280
Patented June 12, 1962

3,038,280
INTERNAL STOCK DIVIDER
Wilhelm Dralle, Detroit, Mich., assignor, by mesne assignments, to Ex-Cell-O Corporation, Detroit, Mich., a corporation of Michigan
Filed June 23, 1958, Ser. No. 743,886
4 Claims. (Cl. 51—277)

This invention relates generally to article positioning devices and refers more particularly to an internal stock divider.

In the form grinding of articles such as gears, a great deal of time is spent in the proper positioning of each article on the supporting holder. Such articles are usually heat treated prior to grinding and as a result of the heat treatment, distortion often occurs. In the case of gears, this distortion may be in different directions in different teeth. It is desirable to average such differences so that the grinding of any one part does not penetrate through the hardened layer, rendering the structure useless. If, however, the work is so positioned that maximum distortions in opposite directions are averaged, less material will be removed from any one part so that all may still be within the hardened layer. The usual practice is to determine such average position by successive tests which consume a great deal of time.

It is therefore the primary object of this invention to provide means for properly positioning each article on the supporting holder by a single test which may be quickly performed. The invention is particularly applicable to articles such as gear wheels which have a series of teeth subject to different distortion during heat treatment. The invention is also applicable to other similar articles such as an anti-friction spline.

Other objects and features of the invention will become apparent as the description proceeds, especially when taken in conjunction with the accompanying drawing, illustrating preferred embodiments of the invention, wherein:

FIG. 1 is a longitudinal sectional view of structure embodying the invention.

FIG. 2 is an elevation in the direction of the arrow 2 in FIG. 1.

FIG. 3 is a sectional view taken on the line 3—3 of FIG. 1.

FIG. 4 is a fragmentary sectional view similar to a portion of FIG. 3 but illustrating a modification.

Referring now more particularly to the drawing and especially to FIGS. 1–3, the internal stock divider is generally indicated by the reference numeral 10 and comprises an elongated cylindrical body 12 having a reduced end 13. A locating member 14 has a split hub 15 encircling and firmly clamped on the reduced end 13 of the body by a bolt 16, the hub abutting the shoulder 17 at the inner end of the reduced portion 13. The internal stock divider is provided for properly angularly positioning an article A with respect to a work holder B. The work holder B includes a chunk C for gripping the article when properly angularly positioned with respect thereto by the internal stock divider.

The article A in the present instance is a hollow cylinder and more specifically is an outer race anti-friction spline having the internal elongated equally angularly spaced projections or splines 18 which extend longitudinally of the article and parallel to its axis.

The body 12 is adapted to extend within the article A in coaxial relation therewith to support it, as shown in the drawing. The body 12 is formed with three equally angularly spaced radial grooves 19 in its outer surface which extend from end to end of the body and parallel to the axis thereof. Three locators 20 are carried by the body, each including an elongated locator bar 21 fitting within a groove 19 for sliding movement radially of the body. At each end, each bar has an enlarged centrally recessed portion 22, the recess extending lengthwise of the bar and adapted to closely receive the registering spline 18 of the article A.

A plunger 23 is secured to each end of each locator bar. The reduced outer end portion 24 of each plunger extends through the recessed end portion 22 of the locator bar and is peened over at its outer end to secure the bar on the shoulder separating the reduced portion of the plunger from the main body portion 25 thereof. The main body portion of the plunger is radially slidable in a radial passage 26 in the body, and a head 27 on the lower end of the plunger is engageable with a cam shaft 28 for moving the plunger and locator bar radially outwardly. The cam shaft 28 extends coaxially within the central passage 29 of the body and has the three cam portions 30 respectively engageable with the plungers of the three locators. The heads of the plungers are urged radially inwardly to be held in contact with the cam shaft by coil springs 31 disposed in counterbored portions of the passages 26 and bearing against the shoulders 32 at the outer ends of the counterbored portions and against the heads. The radial passages 33 are for the purpose of inserting the plungers 23 for assembly with the bars.

The sides of the recesses of the recessed portions 22 conform with the sides of the splines 18, and the sides of each recess will engage the sides of each spline in full surface-to-surface engagement only if there is no distortion of the article A. However, any distortion of the article A resulting in circumferential displacement of the splines will make it impossible for all of the locators to engage the respective splines with sides of the recesses in full surface-to-surface engagement with the sides of the splines. Since the locators are simultaneously and positively moved radially outwardly by the cam shaft, the maximum distortion in opposite directions of the splines will be average, that is the article will be positioned by the locators so that the distortion is averaged out.

The cam shaft is rotated to positively move the locators radially outwardly by an operating handle 35 having a hub 36 secured to the reduced end 37 of the shaft by a pin 38. The shaft is held against longitudinal movement by engagement of the hub 36 with one end of the body and the snap ring 39 on the shaft engageable with the other end of the body. A gage 40 is mounted on hub 15 and has an operating plunger 41 engageable with a flat on hub 36. If the handle 35 is required to be turned more than a specified amount to fix the article A angularly, it indicates that there is not enough metal left for grinding, and the article is discarded.

In operation, the body is inserted into the article so that hub 15 engages the end of the article and the member 14 is rotated, rotating the body, until the locating arm 40 of the member engages a fixed portion of the work holder B. The operating handle 35 is rotated, turning the cam shaft as far as it will go to move the locators radially outwardly to angularly position the article with respect to the stock divider in an average position. The chuck C is then closed to secure the article A in the desired average position for grinding and the stock divider removed. It will be noted that the high parts 50 of the cam portions 30 are substantially cylindrical in order to lock the plungers out after the cam shaft is rotated. Thus the article will not accidentally shift from its adjusted position with respect to the stock divider prior to chucking.

FIG. 4 illustrates a modification in which the article A' is an internal gear, the teeth of which extend parallel to the axis of the gear. The internal stock divider 10' differs from the one shown in FIGS. 1-3 only in the shape of the locator bars. Here again three locators 20' are employed, each including a locator bar 21'. Instead of having a recessed portion at each end, as in FIGS. 1-3, the locator bars have at each end a projection 22' which extends longitudinally of the bar for approximately the same distance as the recessed portion 22 and parallel to the bar. Each projecting portion 22' is shaped to fit exactly the space between adjacent teeth of the gear and to contact the sides thereof. The operation of the device shown in FIG. 4 modification is the same as that shown in FIGS. 1-3.

What I claim as my invention is:

1. Means for angularly positioning with respect to a work holder a workpiece having a series of internal, angularly spaced elongated projections extending axially of the workpiece, comprising an elongated body adapted to extend coaxially within the workpiece to support the latter, a plurality of locators including elongated bars extending axially of said body and supported thereby for radially outward movement along guided paths into engagement with the sides of said projections to angularly locate the workpiece with respect to said body, means for simultaneously positively moving all of the bars supported by said body as aforesaid, including a cam shaft extending coaxially of and rotatable within said body, and plungers carried by said bars, said cam shaft having cam portions engageable with said plungers upon rotation of said cam shaft to move said bars as aforesaid, means for angularly locating said body with respect to the work holder, and an indicator secured to said body, said indicator having an operating plunger extending radially with respect to said cam shaft, said cam shaft having a flat exterior surface portion, said plunger being in contact with said flat exterior surface portion of said shaft whereby said indicator indicates the rotative position of said cam shaft relative to said body.

2. Means for angularly positioning with respect to a work holder a workpiece having a series of internal, angularly spaced elongated projections, comprising a body member adapted to extend within the workpiece to support the latter, a plurality of locators carried by said body for radially outward movement along guided paths into engagement with the sides of said projections to angularly locate the workpiece with respect to said body, means for simultaneously positively moving all of the locators supported by said body as aforesaid, including a cam shaft rotatably mounted within said body, and plungers carried by said locators, said cam shaft having cam portions engageable with said plungers upon rotation of said cam shaft to move said locators as aforesaid, means for angularly locating said body with respect to the work holder and an indicator secured to said body, said indicator having an operating plunger extending radially with respect to said cam shaft, said cam shaft having a flat exterior surface portion, said plunger being in contact with said flat exterior surface portion of said shaft whereby said indicator indicates the rotative position of said cam shaft relative to said body.

3. Means for angularly positioning with respect to a work holder a workpiece having a series of internal, angularly spaced elongated projections, comprising a body member adapted to extend within the workpiece to support the latter, a plurality of locators carried by said body for radially outward movement along guided paths into engagement with the sides of said projections to angularly locate the workpiece with respect to said body, means for simultaneously positively moving all of the locators supported by said body as aforesaid, including a cam shaft rotatably mounted within said body, and plungers carried by said locators, said cam shaft having cam portions engageable with said plungers upon rotation of said cam shaft to move said locators as aforesaid, said indicator having an indicator secured to said body, said indicator having an operating plunger extending radially with respect to said cam shaft, said cam shaft having a flat exterior surface portion, said plunger being in contact with said flat exterior surface portion of said shaft whereby said indicator indicates the rotative position of said cam shaft relative to said body.

4. Means for angularly positioning with respect to a work holder a workpiece having a series of internal, angularly spaced elongated projections extending axially of the workpiece, comprising an elongated body adapted to extend coaxially within the workpiece to support the latter, a plurality of locators including elongated bars extending axially of said body and supported thereby for radially outward movement along guided paths into engagement with the sides of said projections to angularly locate the workpiece with respect to said body, means for simultaneously positively moving all of the bars supported by said body as aforesaid, said moving means including a cam shaft extending coaxially of and rotatable within said body, and plungers carried by said bars, said cam shaft having cam portions engageable with said plungers upon rotation of said cam shaft to move said bars as aforesaid, means for angularly locating said body with respect to the work holder, and indicator means operable between said body and cam shaft to indicate the rotative position of said cam shaft relative to said body.

References Cited in the file of this patent

UNITED STATES PATENTS

| | | |
|---|---|---|
| 325,315 | Brown et al. | Sept. 1, 1885 |
| 761,348 | Baines | May 31, 1904 |
| 1,019,574 | Saum | Mar. 12, 1912 |
| 1,356,574 | Warder | Oct. 26, 1920 |
| 1,720,620 | Bayton | July 9, 1929 |
| 1,794,162 | Flamm | Feb. 24, 1931 |
| 1,885,192 | Ellsner | Nov. 1, 1932 |
| 2,139,154 | Galloway | Dec. 6, 1938 |
| 2,304,148 | Carlsen | Dec. 8, 1942 |
| 2,487,723 | Nordstrom | Nov. 8, 1949 |
| 2,558,689 | Miller | June 26, 1951 |
| 2,798,347 | Brady | July 7, 1957 |